United States Patent
Fujishiro

(10) Patent No.: US 10,313,951 B2
(45) Date of Patent: Jun. 4, 2019

(54) USER TERMINAL AND MOBILE COMMUNICATION METHOD

(71) Applicant: KYOCERA CORPORATION, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 4 days.

(21) Appl. No.: 15/725,685

(22) Filed: Oct. 5, 2017

(65) Prior Publication Data

US 2018/0049094 A1    Feb. 15, 2018

Related U.S. Application Data

(63) Continuation of application No. PCT/JP2016/060008, filed on Mar. 29, 2016.

(60) Provisional application No. 62/145,845, filed on Apr. 10, 2015.

(51) Int. Cl.
    *H04W 36/30*      (2009.01)
    *H04W 48/16*      (2009.01)
    *H04W 36/00*      (2009.01)
    *H04W 36/04*      (2009.01)
    *H04W 36/36*      (2009.01)
    *H04W 48/18*      (2009.01)

(52) U.S. Cl.
    CPC ....... *H04W 36/30* (2013.01); *H04W 36/0072* (2013.01); *H04W 36/04* (2013.01); *H04W 36/36* (2013.01); *H04W 48/16* (2013.01); *H04W 48/18* (2013.01)

(58) Field of Classification Search
    CPC ..... H04W 36/22; H04W 88/08; H04W 24/10; H04W 48/20; H04W 72/042
    USPC .................. 455/436, 437, 439; 370/329, 332
See application file for complete search history.

(56) References Cited

U.S. PATENT DOCUMENTS

2009/0197603 A1    8/2009   Ji et al.
2013/0137440 A1*   5/2013   Clevorn ............ H04W 36/0083
                                                             455/442

FOREIGN PATENT DOCUMENTS

JP          2011-511558 A      4/2011

OTHER PUBLICATIONS

International Search Report issued in PCT/JP2016/060008; dated Jun. 7, 2016.

(Continued)

*Primary Examiner* — Sam Bhattacharya
(74) *Attorney, Agent, or Firm* — Studebaker & Brackett PC

(57) ABSTRACT

UE 100 selects a target cell used as a serving cell from a plurality of cells, based on a potential capacity of each of the plurality of cells operated at different frequencies. The potential capacity is defined by at least any one of a potential capacity of a frequency domain, a potential capacity of a time domain, and a potential capacity of a space domain.

5 Claims, 10 Drawing Sheets

(56) References Cited

OTHER PUBLICATIONS

3rd Generation Partnership Project; Technical Specification Group Radio Access Network; Evolved Universal Terrestrial Radio Access (E-UTRA); User Equipment (UE) procedures in idle mode; 3GPP TS 36.304 V12.4.0; Mar. 2015; pp. 1-38; Release 12; 3GPP Organizational Partners.
Ericsson et al.; Cell-specific prioritization for idle mode load balancing; 3GPP TSG-RAN WG2 Meeting #86; Tdoc R2-142530; May 19-23, 2014; pp. 1-6; Seoul, Republic of Korea.
Kyocera; Potential issues in multi-carrier load distribution; 3GPP TSG-RAN WG2 #89-bis; R2-151540; Apr. 20-24, 2015; pp. 1-5; Bratislava, Slovak Republic.

\* cited by examiner

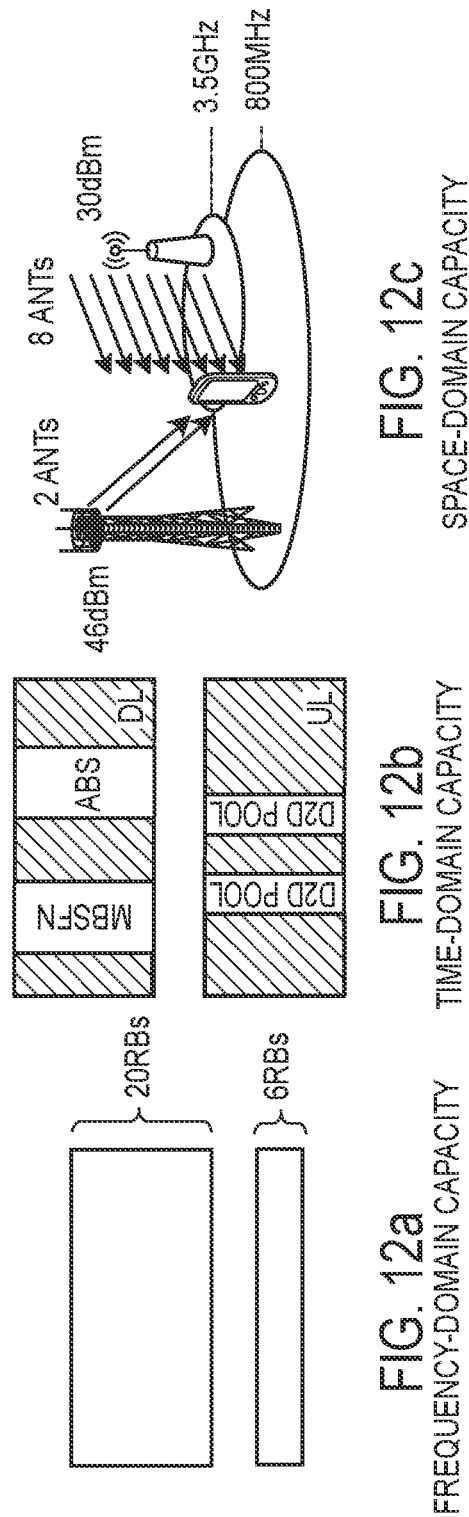

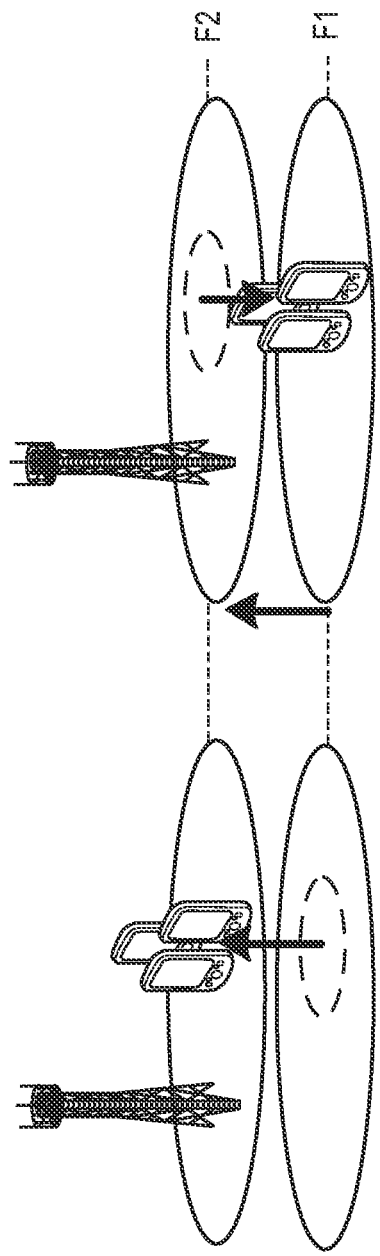

USER TERMINAL AND MOBILE COMMUNICATION METHOD

CROSS-REFERENCE TO RELATED APPLICATION

The present application is a continuation based on PCT Application No. PCT/JP2016/060008 filed on Mar. 29, 2016, which claims the benefit of U.S. provisional application No. 62/145,845 (Apr. 10, 2015). The content of which is incorporated by reference herein in their entirety.

FIELD

The present invention relates to a user terminal and a mobile communication method for selecting a target cell used as a serving cell from a plurality of cells operated at different frequencies.

BACKGROUND

In 3GPP (3rd Generation Partnership Project), which is a project aiming to standardize a mobile communication system, a technology for selecting a target cell used as a serving cell from a plurality of cells operated at different frequencies, has been proposed.

Specifically, a user terminal measures, if start conditions are satisfied, a quality of a neighboring cell adjacent to the current serving cell, and selects, from the cells that satisfy selection conditions, the target cell used as the serving cell.

SUMMARY

A first aspect is abstracted as a user terminal comprising a controller configured to select a target cell used as a serving cell from a plurality of cells, based on a potential capacity of each of the plurality of cells operated at different frequencies, wherein the potential capacity is defined by at least any one of a potential capacity of a frequency domain, a potential capacity of a time domain, and a potential capacity of a space domain.

A second aspect is abstracted as a mobile communication method comprising selecting a target cell used as a serving cell from a plurality of cells, based on a potential capacity of each of the plurality of cells operated at different frequencies, wherein the potential capacity is defined by at least any one of a potential capacity of a frequency domain, a potential capacity of a time domain, and a potential capacity of a space domain.

BRIEF DESCRIPTION OF THE DRAWINGS

FIGS. 12a to 12c are diagrams for describing a potential capacity and a (semi-)static setting according to the appendix.

FIGS. 13a and 13b are diagrams for describing a large-scale reselection of clustered UEs according to the appendix.

DESCRIPTION OF THE EMBODIMENT

Figure 1:
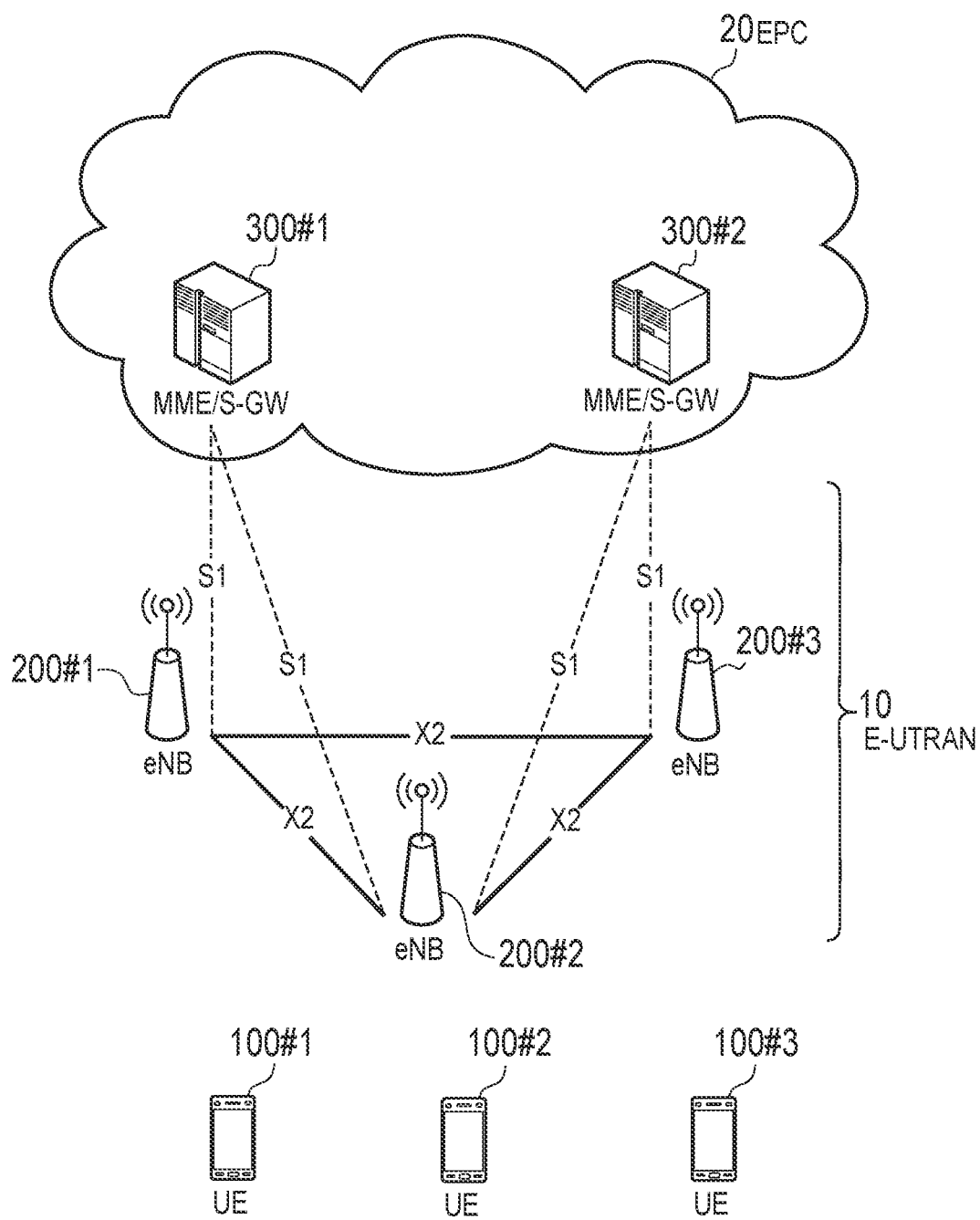
FIG. 1 is a configuration diagram of an LTE system according to an embodiment.

A mobile communication system according to an embodiment is described below by referring to the drawings. In the following description of the drawings, same or similar reference numerals are given to denote same or similar portions.

Note that the drawings are merely schematically shown and proportions of sizes and the like are different from actual ones. Thus, specific sizes and the like should be judged by referring to the description below. In addition, there are of course included portions where relationships or percentages of sizes of the drawings are different with respect to one another.

[Overview of Disclosure]

In the mobile communication system mentioned in the background art, a potential capacity each of the cells potentially has, is not considered in the selection of the target cell used as the serving cell. Therefore, there is a possibility that load distribution of each cell cannot be appropriately performed.

A user terminal according to the summary comprises a controller configured to select a target cell used as a serving cell from a plurality of cells, based on a potential capacity of each of the plurality of cells operated at different frequencies. The potential capacity is defined by at least any one of a potential capacity of a frequency domain, a potential capacity of a time domain, and a potential capacity of a space domain.

In a user terminal according to the summary, the target cell used as the serving cell is selected based on the potential capacity. Therefore, load distribution of each cell can be appropriately performed. In other words, the user terminal in the RRC idle state can be appropriately distributed to each cell.

Embodiments

An embodiment will be described by using, as an example, an LTE system based on 3GPP standards as a mobile communication system, below.

(System Configuration)

The system configuration of LTE system according to a first embodiment will be described. FIG. 1 is a configuration diagram of the LTE system according to the embodiment.

As illustrated in FIG. 1, the LTE system according to the embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell in a case where the UE 100 is in an RRC connected state) formed by the eNB 200. The configuration of the UE 100 will be described later.

The E-UTRAN 10 corresponds to a radio access network. The E-UTRAN 10 includes eNB 200 (an evolved Node-B). The eNB 200 corresponds to a radio base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resources management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface. It is noted that the E-UTRAN 10 and the EPC 20 constitute a network of the LTE system.

Figure 2:
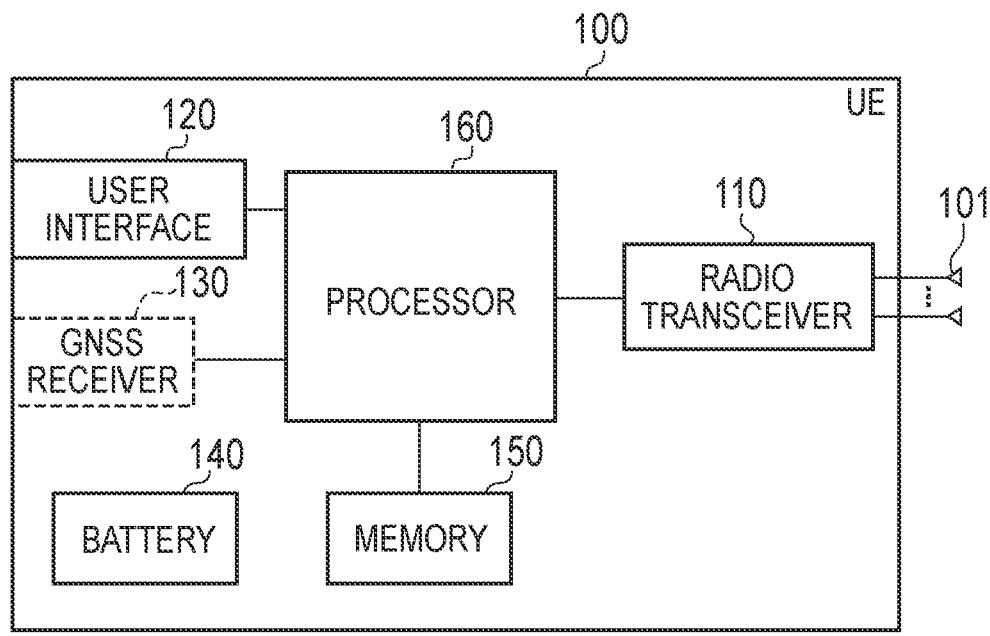
FIG. 2 is a block diagram of a UE 100 according to the embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 constitute a controller. The radio transceiver 110 and the processor 160 constitute a transmitter and a receiver. The UE 100 may not necessarily have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (a reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
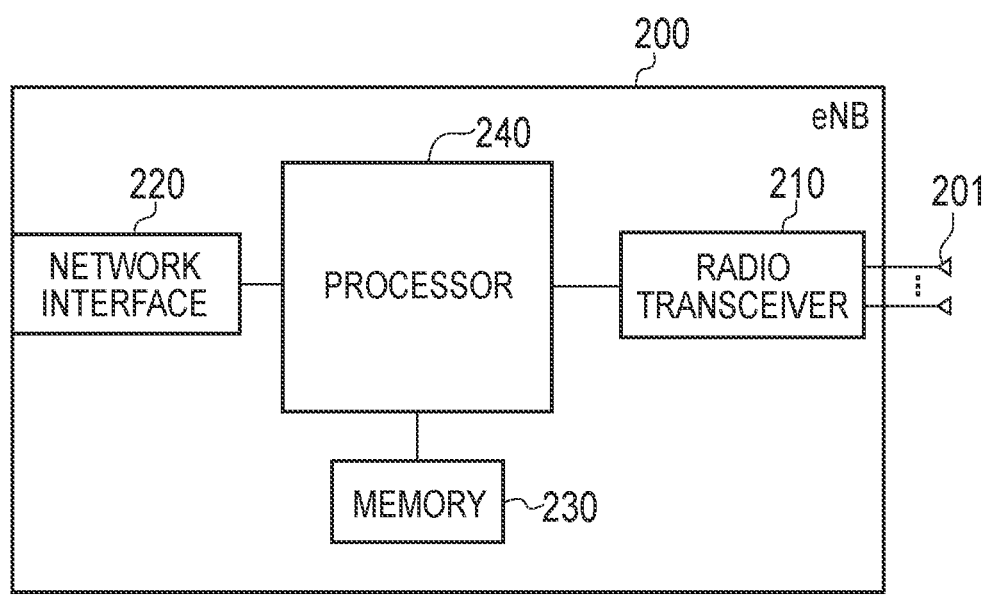
FIG. 3 is a block diagram of an eNB 200 according to the embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 constitute a controller. The radio transceiver 210 and the processor 240 constitute a transmitter and a receiver. Furthermore, the memory 230 may be integrally formed with the processor 240, and this set (that is, a chipset) may be called a processor.

The antenna 201 and the radio transceiver 210 are used to transmit and receive a radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (a reception signal), and outputs the baseband signal to the processor 240.

The network interface 220 is connected to the neighboring eNB 200 via the X2 interface, and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
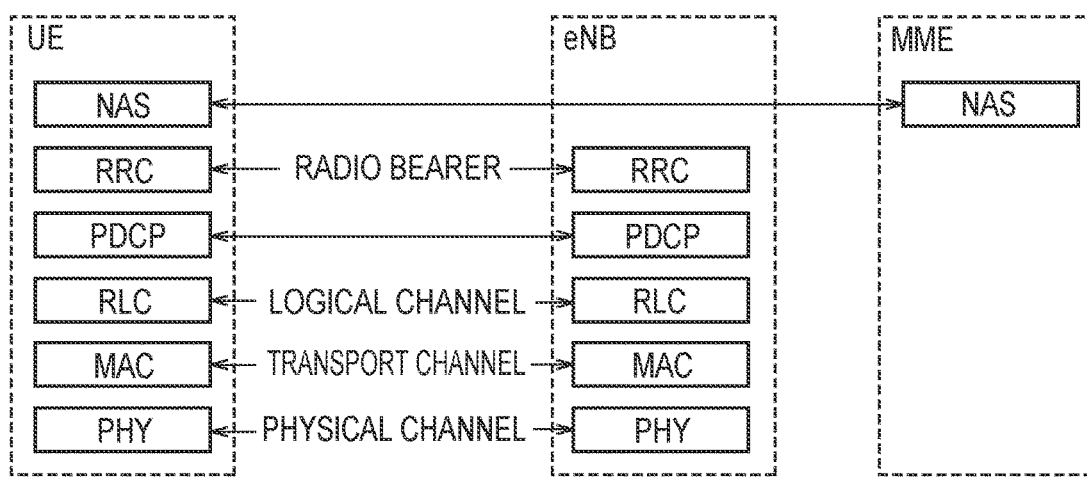
FIG. 4 is a protocol stack diagram of a radio interface according to the embodiment.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Media Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), a random access procedure, and the like. Between the MAC layer of the UE 100 and the MAC layer of the eNB 200, user data and control signals are transmitted via a transport channel. The MAC layer of the eNB 200 includes a scheduler for determining a transport format (a transport block size and a modulation and coding scheme) of an uplink and a downlink, and resource blocks to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption. It should also be noted that in the PDCP layer, a transmitting entity for transmitting data unit (PDCP PDU) or a receiving entity for receiving data unit (PDCP PDU) is formed.

The RRC layer is defined only in a control plane that handles control signals. Between the RRC layer of the UE 100 and the RRC layer of the eNB 200, a control signal (an RRC message) for various types of settings is transmitted.

The RRC layer controls a logical channel, a transport channel, and a physical channel according to the establishment, re-establishment, and release of a radio bearer. When there is a connection (an RRC connection) between the RRC of the UE 100 and the RRC of the eNB 200, the UE 100 is in an RRC connected state. When there is no connection (an RRC connection) between the RRC of the UE 100 and the RRC of the eNB 200, the UE 100 is in an RRC idle state.

An NAS (Non-Access Stratum) layer positioned above the RRC layer performs session management, mobility management and the like.

Figure 5:
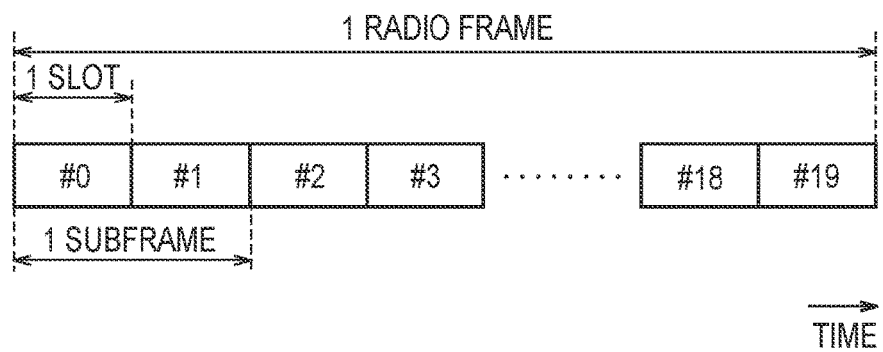
FIG. 5 is a configuration diagram of a radio frame used in the LTE system according to the embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

(Application Scene)

Figure 6:
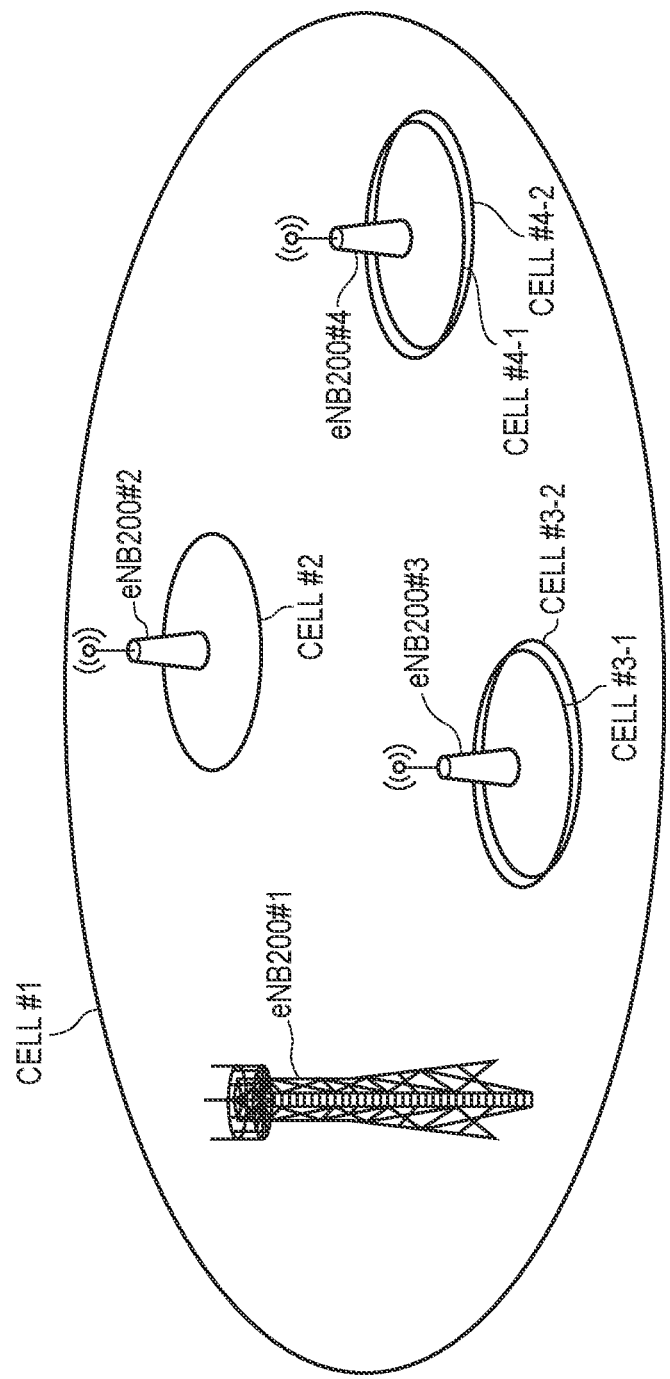
FIG. 6 is a diagram for describing an application scene according to the embodiment.

An application scene will be described, below. FIG. 6 is a diagram for describing an application scene according to the embodiment.

As illustrated in FIG. 6, a plurality of eNBs 200 (for example, an eNB 200 #1, an eNB 200 #2, an eNB 200 #3, and an eNB 200 #4) are provided. The eNB 200 #1 has a cell #1 as the radio communication area, the eNB 200 #2 has a cell #2 as the radio communication area, the eNB 200 #3 has a cell #3-1 and a cell #3-2 as the radio communication area, and the eNB 200 #4 has a cell #4-1 and a cell #4-2 as the radio communication area.

It is noted that the cell #2, the cell #3-1, the cell #3-2, the cell #4-1, and the cell #4-2 overlap with the cell #1. Further, each cell is operated at respectively different frequencies. A priority is defined for the frequencies where each cell is operated. The correspondence relationship between the frequency and the priority is included in system information (SIB; System Information Block) broadcast from the eNB 200.

Under such a premise, the UE 100 selects a target cell used as a serving cell from the plurality of cells operated at different frequencies. Specifically, the UE 100 measures, if start conditions are satisfied, the quality of a neighboring cell adjacent to the current serving cell, and selects, from the cells that satisfy selection conditions, the target cell used as the serving cell.

Firstly, the start conditions are as follows:

(A1) A frequency having a higher priority than the priority of the frequency of the current serving cell
 the UE 100 always measures the quality of the frequency having high priority.

(A2) A frequency having a priority equal to or lower than the priority of the frequency of the current serving cell
 the UE 100 measures, if the quality of the current serving cell falls below a predetermined threshold value, the quality of the frequency having equal priority or lower priority.

Secondly, the selection conditions are shown as follows:

(B1) The priority of the frequency of the neighboring cell is higher than the priority of the current serving cell
 the UE 100 selects a cell that satisfies a relationship of $Squal > Thresh_{X,\ HighQ}$ over a predetermined period ($Treselection_{RAT}$), or a cell that satisfies a relationship of $Srxlev > Thresh_{X,\ HighP}$ over the predetermined period ($Treselection_{RAT}$) as the target cell. In such a case, such criteria to be satisfied by the neighboring cell is sometimes referred to as "S-criteria".

Squal represents a cell selection quality level, and is calculated by $Squal = Q_{qualmeas} - (Q_{qualmin} + Q_{qualminoffset}) - Qoffset_{temp}$. $Q_{qualmeas}$ is a quality level (RSRQ) of the neighboring cell, $Q_{qualmin}$ is a minimum request quality level, $Q_{qualminoffset}$ is a predetermined offset regularly applied to the neighboring cell, and $Qoffset_{temp}$ is an offset temporarily applied to the neighboring cell. $Thresh_{X,\ HighQ}$ is the predetermined threshold value.

Further, Srxlev represents a cell selection reception level, and is calculated by $Srxlev = Q_{rxlevmeas} - (Q_{rxlevmin} + Q_{rxlevminoffset}) - Pcompensation - Qoffset_{temp}$. $Q_{rxlevmeas}$ is a reception level (RSRP) of the neighboring cell, $Q_{rxlevmin}$ is a minimum request reception level, $Q_{rxlevminoffset}$ is the predetermined offset regularly applied to the neighboring cell, Pcompensation is a parameter related to an uplink capability, and $Qoffset_{temp}$ is the offset temporarily applied to the neighboring cell. $Thresh_{X,\ HighP}$ is the predetermined threshold value.

(B2) The priority of the frequency of the neighboring cell is the same as the priority of the current serving cell
 the UE 100 calculates a ranking $R_s$ of the current serving cell and a ranking $R_n$ of the neighboring cell, and selects, as the target cell, the cell having the higher ranking $R_n$ than the $R_s$ over the predetermined period ($Treselection_{RAT}$). In such a case, such criteria to be satisfied by the neighboring cell is sometimes referred to as "R-criteria".

$R_s$ is calculated by $R_s = Q_{meas,s} + Q_{Hyst} - Qoffset_{temp}$. $R_n$ is calculated by $R_n = Q_{meas,n} - Qoffset - Qoffset_{temp}$. $Q_{meas,s}$ is the reception level (RSRP) of the current serving cell, and $Q_{meas,n}$ is the reception level (RSRP) of the neighboring cell. $Q_{Hyst}$ is a hysteresis value for achieving preferential reselection of the current serving cell as the target cell. $Qoffset_{temp}$ is the offset temporarily applied to the current serving cell and the neighboring cell.

(B3) The priority of the frequency of the neighboring cell is lower than the priority of the current serving cell
 the UE 100 selects, under a premise that $Squal < Thresh_{Serving,\ LowQ}$ is satisfied over the predetermined period ($Treselection_{RAT}$), or $Srxlev < Thresh_{Serving,\ LowP}$ is satisfied over the predetermined period ($Treselection_{RAT}$), the target cell from the neighboring cells by a similar procedure to the above described (B1).

$Thresh_{Serving,\ LowQ}$ and $Thresh_{Serving,\ LowP}$ are predetermined threshold values similarly to $Thresh_{X,\ HighQ}$ and $Thresh_{X,\ HighP}$.

It is noted that, various types of parameters used for selecting the target cell are included in the system information (SIB; System Information Block) broadcast from the eNB 200. The various types of parameters include the priority of the frequency (cellReselectionPriority), the predetermined period ($Treselection_{RAT}$), the various types of offsets ($Q_{qualminoffset}$, $Q_{rxlevminoffset}$, $Qoffset_{temp}$, $Q_{Hyst}$, $Qoffset$), and the various types of threshold values ($Thresh_{X,\ HighQ}$, $Thresh_{X,\ HighP}$, $Thresh_{Serving,\ LowQ}$, $Thresh_{Serving,\ LowP}$).

In the embodiment, the UE 100 (controller) selects the target cell used as the serving cell from a plurality of cells, based on the potential capacity of each of the plurality of cells operated at different frequencies. The potential capacity is defined by at least any one of a potential capacity of a frequency domain, a potential capacity of a time domain, and a potential capacity of a space domain.

Figure 7:
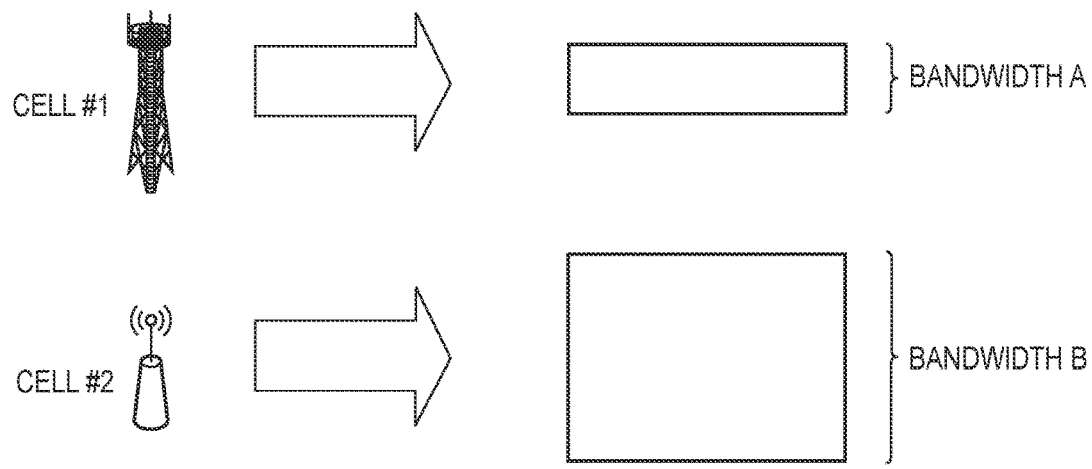
FIG. 7 is a diagram for describing a potential capacity according to the embodiment.

As illustrated in FIG. 7, the potential capacity of the frequency domain is a bandwidth of the frequency at which each cell is operated. For example, a frequency at which the above-mentioned cell #1 is operated, has a bandwidth A, and a frequency at which the above-mentioned cell #2 is operated, has a bandwidth B that is wider than the bandwidth A.

Figure 8:
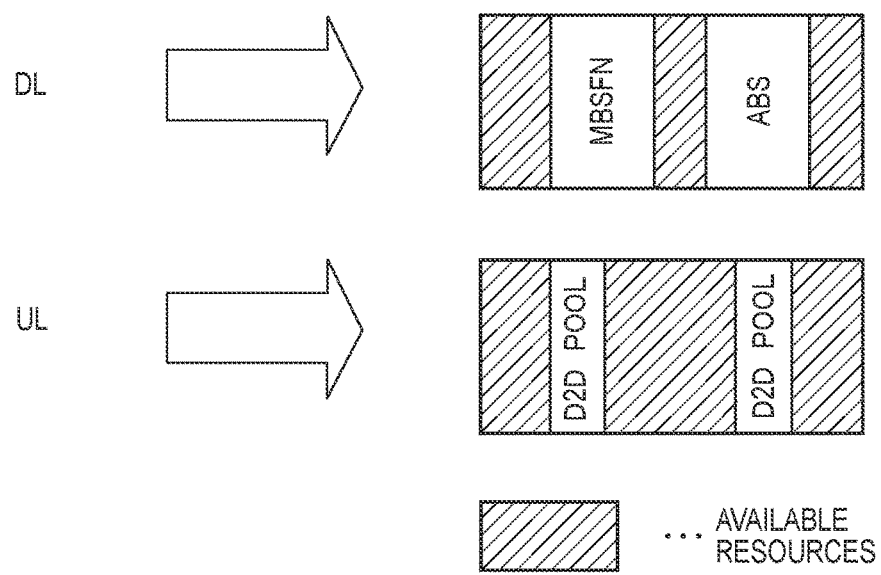
FIG. 8 is a diagram for describing a potential capacity according to the embodiment.

As illustrated in FIG. 8, the potential capacity of the time domain is an allocatable resource (available resource) in a time-axis direction to transmit user data. For example, in the downlink DL, an available resource excludes a subframe used in a multicast broadcase single frequency network (MBSFN), an almost blank subframe (ABS) used for interference reduction, a cyclic prefix (CP) inserted at the beginning of an OFDM subframe, and the like. In the uplink UL, an available resource excludes a resource allocated for a D2D (D2D pool).

The potential capacity of the space domain includes a transmission power of each cell, a center frequency of the frequencies at which each of the cells are operated, and a number of antennas (stream number) each of the cells possesses.

As described in (B1) to (B3) above, the UE 100 (controller) selects the target cell from the cells having a quality that satisfies the predetermined quality criteria (S-criteria or R-criteria). The UE 100 (controller) corrects the quality (for example, Squal, Srxlev, $Q_{meas,s}$, $Q_{meas,n}$), based on the potential capacity. In such a case, the UE 100 (controller) corrects the quality (for example, Squal, Srxlev, $Q_{meas,s}$, $Q_{meas,n}$) so that the quality becomes higher with increasing the potential capacity. For example, as a correction method for the quality, new values may be defined as the various types of offsets ($Q_{qualminoffset}$, $Q_{rxlevminoffset}$, $Qoffset_{temp}$, $Q_{Hyst}$, Qoffset), or a new offset may be introduced.

Alternatively, the UE 100 (controller) is more likely to select, as the target cell, a priority cell having a potential capacity that satisfies a predetermined capacity threshold value, compared to a cell having a potential capacity that does not satisfy the predetermined capacity threshold value. For example, new evaluation criteria (C-criteria) is introduced so that a cell that satisfies the relation Effective resources≥threshold+offset, is more likely to be selected as the target cell. The "Effective resources" correspond to the potential capacity, the "threshold" corresponds to the predetermined threshold value, and the "offset" corresponds to the predetermined offset. In such a case, a condition that new evaluation criteria (C-criteria) is satisfied may be added as a selection condition for the target cell, and the ranking ($R_s$, $R_n$) of the cells satisfying the new evaluation criteria (C-criteria) may be corrected to a higher ranking.

Alternatively, the UE 100 (controller) may select the target cell from the cells having the quality that satisfies the predetermined quality criteria (S-criteria or R-criteria), based on the potential capacity. In other words, the UE 100 (controller) identifies the cells having the quality that satisfies the predetermined quality criteria (S-criteria or R-criteria), and selects, based on the potential capacity, the target cell from the identified cells. In the selection of the target cell based on the potential capacity, a cell having a high potential capacity is more likely to be selected as the target cell. Furthermore, in the selection of the target cell based on the potential capacity, a ranking of the cells having the quality that satisfies the predetermined quality criteria (S-criteria or R-criteria) may be performed using the above-mentioned new evaluation criteria (C-criteria).

According to the embodiment, it is preferable that the UE 100 (controller) identifies the potential capacity of each of the plurality of cells, based on system information (SIB; system information block) broadcast from each of the plurality of cells. In such a case, it is preferable that the information for identifying the potential capacity is included in one system information (SIB; system information block) broadcast from each of the plurality of cells. Furthermore, the system information broadcast from each cell may include, in addition to the information for identifying the potential capacity of the cell, information for identifying a potential capacity of the neighboring cell adjacent to the cell.

(Mobile Communication Method)

Figure 9:
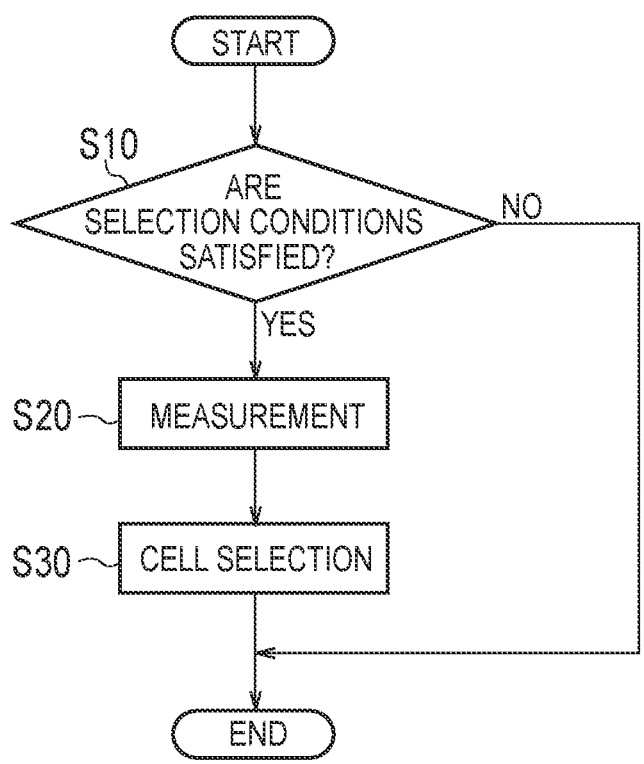
FIG. 9 is a flowchart illustrating a mobile communication method according to the embodiment.
Figure 10:
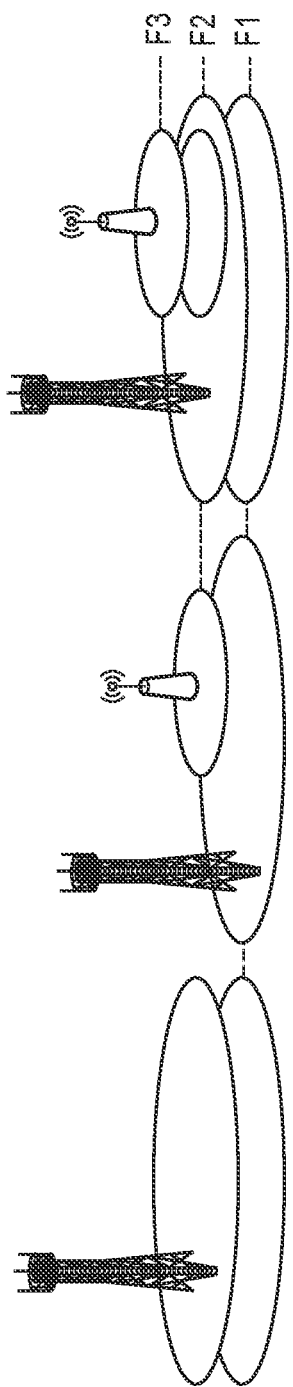
FIGS. 10a to 10c are diagrams for describing a deployment scenario according to an appendix.

A mobile communication method according to the embodiment will be described, below. FIG. 9 is a flowchart illustrating a mobile communication method according to the embodiment. It should be noted that the flow illustrated in FIG. 9 is performed by the UE 100.

As illustrated in FIG. 9, in step S10, the UE 100 determines whether or not the start conditions for starting a measurement of the quality of the neighboring cell adjacent to the current serving cell, are satisfied. If a determination result is YES, the UE 100 performs a process of step S20. On the other hand, if the determination result is NO, the UE 100 ends the series of processes.

It is noted that, the start conditions are shown as follows, as described above:

(A1) A frequency having a higher priority than the priority of the frequency of the current serving cell
  the UE 100 always measures the quality of the frequency having high priority.

(A2) A frequency having a priority equal to or lower than the priority of the frequency of the current serving cell
  the UE 100 measures, if the quality of the current serving cell falls below a predetermined threshold value, the quality of the frequency having equal priority or lower priority.

In step S20, the UE 100 measures the quality of the neighboring cell adjacent to the current serving cell. As described above, the quality is the RSRQ or the RSRP. The frequency to be measured is a frequency as described in (A1) and (A2).

In step S30, the UE 100 selects the target cell used as the serving cell from the plurality of cells, based on the potential capacity of each of the plurality of cells operated at different frequencies.

In such a case, upon selecting the target cell from the cells having the quality that satisfies the predetermined quality criteria (S-criteria or R-criteria), the UE 100 may correct the quality (for example, Squal, Srxlev, $Q_{meas,s}$, $Q_{meas,n}$), based on the potential capacity.

Alternatively, after identifying the cell having the quality that satisfies the predetermined quality criteria (S-criteria or R-criteria), the UE 100 may select the target cell from the identified cells, based on the potential capacity.

Alternatively, by using the newly introduced evaluation criteria (C-criteria), the UE 100 may be more likely to select, as the target cell, the priority cell having the potential capacity that satisfies the predetermined capacity threshold value, compared to the cell having the potential capacity that does not satisfy the predetermined capacity threshold value.

(Operation and Effect)

In a UE 100 according to the embodiment, the target cell used as the serving cell is selected based on the potential capacity. Therefore, load distribution of each cell can be appropriately performed. In other words, UEs 100 in the RRC idle state can be appropriately distributed to each cell.

Other Embodiments

The present invention was described in terms of the embodiment set forth above, however, the invention should not be understood to be limited by the statements and the drawings constituting a part of this disclosure. From this disclosure, various alternative embodiments, examples, and operational technologies will become apparent to those skilled in the art.

Although not particularly mentioned in the embodiments, a program may be provided for causing a computer to execute each process performed by the UE 100 and the eNB 200. Furthermore, the program may be recorded on a computer-readable medium. If the computer-readable medium is used, it is possible to install the program in a computer. Here, the computer-readable medium recording the program may be a non-transitory recording medium. The non-transitory recording medium is not particularly limited; examples thereof may include a recording medium such as a CD-ROM and a DVD-ROM.

Alternatively, a chip may be provided which is configured by: a memory configured to store a program for performing each process performed by the UE 100 and the eNB 200; and a processor configured to execute the program stored in the memory.

In the embodiment, the LTE system is described as an example of a mobile communication system. However, the embodiment is not limited thereto. The mobile communication system may be a system other than the LTE system.

APPENDIX

1. Introduction

A new work item on Multicarrier Load Distribution of UEs in LTE is approved and the objective of this work item is to enhance the cell reselection mechanism in IDLE under up-to-date multicarrier operations;

There are the following study phases.

Study phases: Limitations of the current mechanisms and measurement quantities for redistribution of UEs amongst multiple LTE carriers.

Based on the analysis of the study phase, the following solutions should be provided.

- To redistribute RRC Idle UEs amongst LTE carriers that minimize the need for load triggered HO or redirection of UE during connected mode.
- Carriers with different cell load, bandwidth and capabilities should be considered.
- Both homogeneous and heterogeneous deployment scenarios should be considered.
- New measurement quantities, e.g. SINR, for better estimation of user throughput should be evaluated and introduced, if needed.

In this appendix, the potential issues in the cell reselection mechanism for multi-carrier load distribution are identified in support of the study phase.

2. Discussion (2.1. Deployment Scenarios)

The examples of multi-carrier deployment scenario are pointed out. For example, homogeneous coverage among multiple carriers (inter-frequency HomoNet), heterogeneous coverage between multiple carriers (inter-frequency HetNet), and the combination of these two scenarios, are ponied out. Although a unified solution applicable to all three scenarios is desirable, scenario-specific solutions should also be considered if significant benefits can be realized. Therefore, any proposed solution should be evaluated based on its applicability to specific deployment scenario(s) and whether it causes degradation (e.g., ping-ponging in reselection) in the non-intended deployment scenarios.

Proposal 1: The solutions should be applicable to at least one deployment scenario in inter-frequency HomoNet, inter-frequency HetNet or the combination of the two scenarios, and the solutions should not have negative impact on the non-intended scenarios.

(2.2. Limitation in the Existing Cell Reselection Mechanism)

The cell (re)selection parameters are provided by SIBs or dedicated signalling (RRC Connection Reject or RRC Connection Release messages) and the cell reselection procedure is performed in the UE using the parameters. Focusing on normal cell reselection (i.e., without dedicated parameters), SIB3 provides common parameters, while SIB4 provides intra-frequency specific parameters and SIB5 provides inter-frequency specific parameters. With these parameters, the UE performs frequency prioritization according to the cell reselection priority, the measurements of RSRP/RSRQ, the evaluations of the S-criterion, and the ranking of cells with the R-criterion, and then it finds out the most suitable cell to reselect and camp on.

Figure 11:
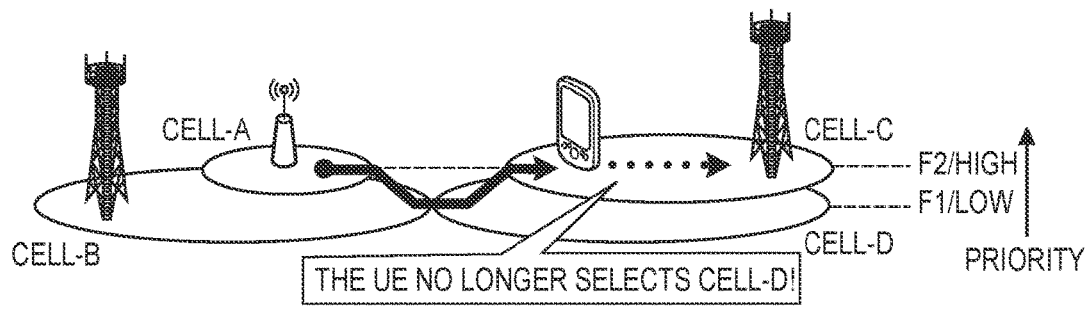
FIG. 11 is a diagram for describing a "lock-on" for frequencies of high priority according to the appendix.

In the prioritization and measurement phase, the UE may not perform intra-frequency measurement when the S-criterion of the serving cell is fulfilled. In addition, the UE may not perform inter-frequency measurement unless the reselection priority of the neighbour frequency is higher than that of the serving frequency or the S-criterion of the serving cell is not fulfilled. It's obvious that the cell resection procedure is not triggered unless the measurement is performed, even if more suitable cell is actually available. It's one of limitations in the current cell reselection procedure and causes lopsided UE distribution in some cases, e.g., "lock-on" with idle mode mobility illustrated in FIG. 11.

In addition, there are exceptions in the prioritization phase. The UE is allowed to deviate from the normal frequency prioritization to selection rule and select a different frequency that provides MBMS services of interest. Moreover, Rel-12 ProSe direct communication introduced a similar rule that "If the UE capable of ProSe direct communication is configured to perform ProSe direct communication and can only perform the ProSe direct communication while camping on a frequency, the UE may consider that frequency to be the highest priority". Therefore, it is likely that cells on frequencies offering MBMS and/or ProSe experience congestion more often than those that do not, if there are many UEs interested in these types of services.

Note that it is assumed that the cell reselection for inter-RAT and CSG cell is out of the scope of this work item.

Proposal 2: It should consider how load balance may be achieved between a low priority frequency and a high priority frequency with the understanding that the UE is also allowed to prioritize a frequency based on its interest in MBMS and/or ProSe.

In the evaluation and ranking phase, both the S-criterion and the R-criterion use RSRP and RSRQ which are measured by the UE. However, it was pointed out in that RSRQ is not a sufficient metric for determining SINR since RSRQ has a narrow dynamic range and it becomes a non-linear function of SINR above 5 dB and is saturated around 10 dB. However, the throughput is kept almost linear between 0 dB and 30 dB. The limitation with RSRQ measurement is particularly troublesome for higher category UEs (e.g., smartphones) since this may degrade the achievable user throughput. Therefore, in order to maximize achievable user throughput after transitioning to RRC CONNECTED, at least the ranking process using RSRQ is no longer adequate and a new measurement metric, with a better estimate of SINR is desirable.

Observation 1: At least the ranking process for the higher category UEs should be based on a more accurate measurement metric than RSRQ.

Unlike smartphones, the MTC devices with lower UE category don't need too much higher SINR, since the throughput ends up hitting the limits capped by the Maximum number of DL-SCH transport block bits received within a TTI. Especially for such lower category UEs, it should be taken into consideration to avoid unnecessary power consumption due to the increased measurements using the new metric.

Proposal 3: It should avoid additional power consumption for lower category UEs.

(2.3. Potential Issues and Challenges)

In this section, the potential issues, other than the limitations identified in section 2.2, are discussed.

(2.3.1. Potential Capacity (Static)/Cell Load (Dynamic) Awareness Distribution)

The potential capacities of frequencies/cells are different since cells have independent configuration of parameters such as bandwidth, CP length, almost blank subframes (ABS), MBSFN subframes, ProSe resource pools, number of antennas and/or cell sizes depending on transmission power of eNB and operating frequency. These can be categorized into frequency-domain, time-domain and space-domain (illustrated in FIG. 12). The potential capacity of a cell may be determined as a function of the above parameters, and since these configurations are typically (semi-) static and are already provided in SIBs, they may be acquired by IDLE UEs through UE implementation or assistance from their serving cells. Since a cell's capacity is directly related to the potential for user throughput UEs should take such cell capacity into account as part of cell reselection.

Proposal 4: The cell reselection procedure should take into account the configurations of neighbour cells.

As intended in, more dynamic information such as current cell loads will facilitate more suitable cell reselection; however, the direct broadcast of load information isn't acceptable by some operators based on previous discussions e.g., Rel-12 WLAN Interworking. As in the case for WLAN Interworking, the cell loads are implicitly provided through the configurations of RAN assistance parameters, i.e., RSRP/RSRQ thresholds. Since a cell's load is an integral part of idle mode UE distribution, it should be considered whether implicit or direct configuration of a cell's load should also be considered for optimizing cell reselection.

Proposal 5: RAN2 should discuss whether it can be acceptable to provide dynamic information such as current cell load to IDLE UEs, directly or implicitly.

(2.3.2. Clustered UE Distribution)

In general, it is well-known that the density of users is not uniform in an area and the user tends to cluster within specific spots, e.g., in a building, on a main street, in a stadium and so on. Therefore, the distribution of UE clusters among multiple carriers within an eNB coverage area may be one of the keys to successful load distribution.

With connected mode UEs, load balancing may be resolved using existing mechanisms such as redirections or handovers. On the other hand, idle mode UEs basically applies the common configuration provided by SIBs. Assuming the clustered UEs experience similar radio conditions, i.e., RSRP and RSRQ, the current cell reselection mechanism cannot split the cluster, i.e., these UEs may reselect based on the same S-criterion/R-criterion. So, even if cell reselection parameters are adjusted by the eNB, it simply results in "mass reselection" and load balancing among multiple carriers cannot be achieved (as illustrated in FIG. 13). To avoid the mass reselection and achieve better load balancing, it should be possible for a group of UEs within the cluster to select cell(s) that differ from cell(s) selected by other group of UEs within the cluster. It should be further considered whether it would be beneficial for the cells to be reselected using some kind of UE-by-UE randomization scheme. Such a randomization scheme could be based on an acceptable measurement range e.g., Cell Reselection Priority and/or R-criterion, where the measurement range is under control of the eNB. Therefore, it should consider how to achieve load balance of the clustered UEs.

Proposal 6: It should consider how to achieve load balancing of the clustered UEs among multiple carriers.

3. Conclusion

In this appendix, the limitations in the existing cell reselection procedure are identified. The potential issues to achieve smarter load balance mechanism among multiple carriers are discussed and the challenges are proposed.

INDUSTRIAL APPLICABILITY

The present invention is useful in the field of communication.

The invention claimed is:

1. A user terminal comprising:
    a controller configured to select a target cell used as a serving cell from a plurality of cells, based on a potential capacity of each of the plurality of cells operated at different frequencies, wherein
    the potential capacity is defined by at least any one of a bandwidth of the frequency at which the cell is operated, an allocatable resource of the cell in a time-axis direction to transmit user data, and a number of antennas the cell possesses,
    the controller is configured to select the target cell from cells having a quality that satisfies a predetermined quality criteria,
    the controller is configured to correct the quality, based on the potential capacity, and
    the controller is configured to identify the potential capacity of each of the plurality of cells, based on system information broadcast from each of the plurality of cells.

2. The user terminal according to claim 1, wherein
    the controller is configured to more likely to select, as the target cell, a priority cell having the potential capacity that satisfies a predetermined capacity threshold value, compared to a cell having the potential capacity that does not satisfy the predetermined capacity threshold value.

3. The user terminal according to claim 1, wherein the controller is configured to select, based on the potential capacity, the target cell from the cells having the quality that satisfies the predetermined quality criteria.

4. The user terminal according to claim 1, wherein the information for identifying the potential capacity is included in one system information broadcast from each of the plurality of cells.

5. A mobile communication method comprising:
selecting a target cell used as a serving cell from a plurality of cells, based on a potential capacity of each of the plurality of cells operated at different frequencies, the target cell being selected from cells having a quality that satisfies a predetermined quality criteria, and wherein
the potential capacity is defined by at least any one of a bandwidth of the frequency at which the cell is operated, an allocatable resource of the cell in a time-axis direction to transmit user data, and a number of antennas the cell possesses; and
correcting the quality based on the potential capacity, wherein
the mobile communication method further comprises identifying the potential capacity of each of the plurality of cells, based on system information broadcast from each of the plurality of cells.

* * * * *